US011240357B2

United States Patent
Wu et al.

(10) Patent No.: US 11,240,357 B2
(45) Date of Patent: Feb. 1, 2022

(54) ELECTRONIC DEVICE

(71) Applicant: ASUSTeK COMPUTER INC., Taipei (TW)

(72) Inventors: I-Hsi Wu, Taipei (TW); Jen-Pang Hsu, Taipei (TW); Kai-Yu Shu, Taipei (TW); Yi-Yuan Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/866,853

(22) Filed: May 5, 2020

(65) Prior Publication Data

US 2020/0366773 A1    Nov. 19, 2020

Related U.S. Application Data

(60) Provisional application No. 62/848,074, filed on May 15, 2019.

(30) Foreign Application Priority Data

Nov. 29, 2019    (TW) .................................. 108143803

(51) Int. Cl.
*H04M 1/02* (2006.01)
*H04N 5/225* (2006.01)
*H04N 5/232* (2006.01)
*H04M 1/72454* (2021.01)
*H04M 1/72484* (2021.01)

(52) U.S. Cl.
CPC ..... *H04M 1/0264* (2013.01); *H04M 1/72454* (2021.01); *H04M 1/72484* (2021.01); *H04N 5/2257* (2013.01); *H04N 5/23219* (2013.01); *H04M 2250/20* (2013.01); *H04M 2250/52* (2013.01)

(58) Field of Classification Search
USPC ...................................................... 348/14.02
See application file for complete search history.

(56) References Cited

U.S. PATENT DOCUMENTS 6,933,981 B1 *    8/2005    Kishida .............. H04N 1/00249
                                                  348/207.1
7,627,342 B2    12/2009    Kang
(Continued)

FOREIGN PATENT DOCUMENTS

CN    1633136 A    6/2005
CN    1979322 A    6/2007
(Continued)

*Primary Examiner* — Maria El-Zoobi
(74) *Attorney, Agent, or Firm* — McClure, Qualey & Rodack, LLP

(57) ABSTRACT

An electronic device is provided, which includes: a body; a camera module, rotatably disposed on the body; a motor, connected to the camera module, and configured to drive the camera module to rotate between a front camera position and a rear camera position relative to the body; a first direction sensor, disposed on the body and configured to provide a first sensing signal; a second direction sensor, disposed on the camera module and configured to provide a second sensing signal; and a processor, electrically connected to the motor, the first direction sensor, and the second direction sensor, and the processor is configured to control the motor based on the first sensing signal and the second sensing signal.

9 Claims, 6 Drawing Sheets

(56) References Cited

U.S. PATENT DOCUMENTS

| | | | |
|---|---|---|---|
| 7,672,118 B2 | 3/2010 | Yamazato et al. | |
| 7,782,375 B2 | 8/2010 | Chambers et al. | |
| 8,010,154 B2 | 8/2011 | Chambers et al. | |
| 10,291,847 B2 | 5/2019 | Chin et al. | |
| 2003/0220145 A1 | 11/2003 | Erickson et al. | |
| 2005/0024500 A1 | 2/2005 | Katayama | |
| 2005/0110874 A1* | 5/2005 | Song | H04M 1/656 348/207.99 |
| 2007/0132835 A1 | 6/2007 | Kang | |
| 2014/0320604 A1 | 10/2014 | Dalvi et al. | |
| 2014/0354779 A1 | 12/2014 | Cho et al. | |
| 2015/0189175 A1* | 7/2015 | Fan | H04N 5/2251 348/37 |
| 2015/0370226 A1 | 12/2015 | Kim et al. | |

FOREIGN PATENT DOCUMENTS

| | | |
|---|---|---|
| CN | 101634871 A | 1/2010 |
| CN | 102170493 A | 8/2011 |
| CN | 102572031 B | 12/2014 |
| CN | 104255015 A | 12/2014 |
| CN | 104469165 A | 3/2015 |
| CN | 204425471 U | 6/2015 |
| CN | 104954675 A | 9/2015 |
| CN | 105827847 A | 8/2016 |
| CN | 105955779 A | 9/2016 |
| CN | 107333055 A | 11/2017 |
| CN | 107509038 A | 12/2017 |
| CN | 107671862 A | 2/2018 |
| CN | 104954676 B | 3/2018 |
| CN | 107819907 A | 3/2018 |
| CN | 107872582 A | 4/2018 |
| CN | 207530941 U | 6/2018 |
| CN | 104301609 B | 9/2018 |
| CN | 108495039 A | 9/2018 |
| CN | 108509782 A | 9/2018 |
| CN | 108566510 A | 9/2018 |
| CN | 108683795 A | 10/2018 |
| CN | 108989660 A | 12/2018 |
| CN | 109167894 A | 1/2019 |
| CN | 109388925 A | 2/2019 |
| CN | 103873652 B | 3/2019 |
| CN | 109639965 A | 4/2019 |
| TW | M417729 U1 | 12/2011 |
| TW | M436853 U1 | 9/2012 |
| TW | 201631954 A | 9/2016 |
| TW | 201702808 A | 1/2017 |

* cited by examiner

ELECTRONIC DEVICE

CROSS-REFERENCE TO RELATED APPLICATION

This application claims the priority benefit of Taiwan application serial No. 108143803 filed on Nov. 29, 2019, and U.S. provisional application Ser. No. 62/848,074, filed on May 15, 2019. The entirety of the above-mentioned patent application is hereby incorporated by reference herein and made a part of specification.

BACKGROUND OF THE INVENTION

Field of the Invention

The invention relates to an electronic device.

Description of the Related Art

Most mobile devices such as smart phones are equipped with cameras. In order to improve the user experience, the diverse of camera functions, modules layout in a device and the related operation modes should be diversified.

BRIEF SUMMARY OF THE INVENTION

According to the first aspect, an electronic device is provided. The electronic device, comprises: a body; a camera module, rotatably disposed on the body; a motor, connected to the camera module, and configured to drive the camera module to rotate between a front camera position and a rear camera position relative to the body; a first direction sensor, disposed on the body and configured to provide a first sensing signal; a second direction sensor, disposed on the camera module and configured to provide a second sensing signal; and a processor, electrically connected to the motor, the first direction sensor, and the second direction sensor, and the processor is configured to control the motor based on the first sensing signal and the second sensing signal.

The electronic device disclosed herein includes a rotatable camera module, and a direction sensor is provided on each of the camera module and the electronic device body. The processor of the electronic device controls the motor that drives the camera module based on the measurement results of the direction sensor, which provides various functions.

These and other features, aspects and advantages of the present invention will become better understood with regard to the following description, appended claims, and accompanying drawings.

DETAILED DESCRIPTION OF THE EMBODIMENTS

Figure 1:
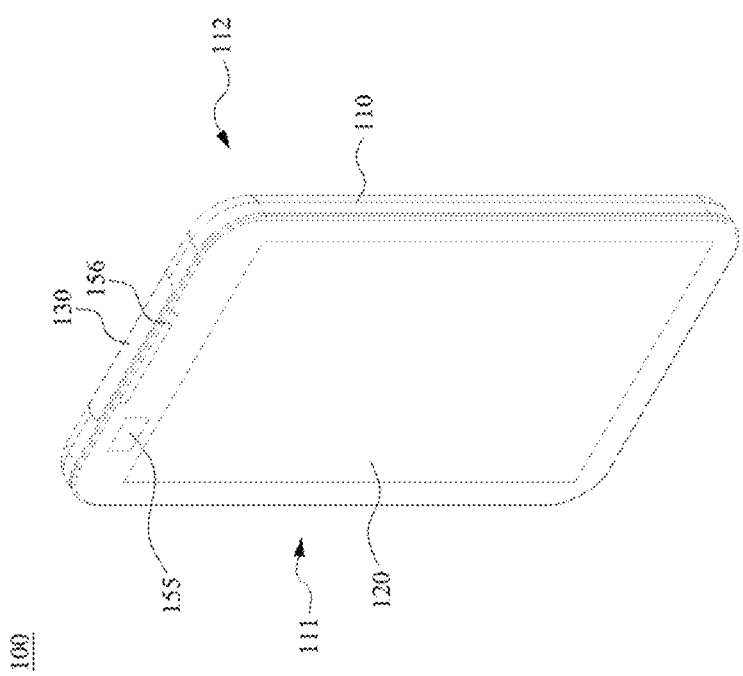
FIG. 1 is a perspective view illustrating an electronic device according to an embodiment.

To make the description of this disclosure more detailed and complete, reference may be made to the accompanying drawings and various embodiments described below. Elements in the figures are not drawn to scale and are provided merely to illustrate the present disclosure. Many practical details are described below to provide a comprehensive understanding of the disclosure. However, those of ordinary skill in the relevant arts should understand that the disclosure can be implemented without one or more practical details. Therefore, these details are not apply to limit this disclosure.

Please refer to FIG. 1 to FIG. 5. The electronic device 100 (such as a smartphone) includes a body 110, a display screen 120, a camera module 130, and a motor 140. The body 110 has a first side 111 and a second side 112 opposite with each other, the display screen 120 is disposed on the first side 111 of the body 110, and the camera module 130 is rotatably disposed on the second side 112 of the body 110. The camera module 130 is configured to rotate to a first position (such as a rear camera position), a second position (such as a front camera position), or a position between the first position and the second position. In an embodiment, the body 110 has an accommodation space 113, the accommodation space 113 is a recess of the body 110 on the second side 112, and the camera module 130 is housed in the accommodation space 113. In some embodiments, the camera module 130 includes a photosensitive element, a lens, and a laser focusing element.

As mentioned above, the motor 140 is disposed in the body 110 and connected to the camera module 130 to drive the camera module 130 to rotate. When the motor 140 drives the camera module 130 to rotate relative to the body 110 to the front camera position shown in FIG. 3, the camera module 130 faces the same direction as the display screen 120. When the motor 140 drives the camera module 130 to rotate relative to the body 110 to the rear camera position shown in FIG. 2, the camera module 130 is located in the accommodation space 113. The electronic device 100 also includes a processor 153 The processor is electrically connected to the motor 140 and configured to control the motor 140 to drive the camera module 130 to rotate (in an embodiment, the processor 153 sends a control signal to the motor 140 to cause the motor 140 to drive the camera module 130 to rotate).

In some embodiments, the electronic device 100 is configured to execute a camera application. When the camera application switches to a front camera mode in response to a user operation, the processor 153 controls the motor 140 to drive the camera module 130 to rotate to the front camera position as shown in FIG. 3. Conversely, when the camera application switches to the rear camera mode in response to a user operation, the processor 153 controls the motor 140 to drive the camera module 130 to rotate to the rear camera position as shown in FIG. 2.

In some embodiments, when the user closes the camera application, the processor 153 controls the motor 140 to drive the camera module 130 to rotate to the rear camera position. In some embodiments, the camera application has an automatic panoramic shooting function. When the automatic panoramic shooting function completes, the processor 153 controls the motor 140 to drive the camera module 130 to rotate to the rear camera position.

Figure 2:
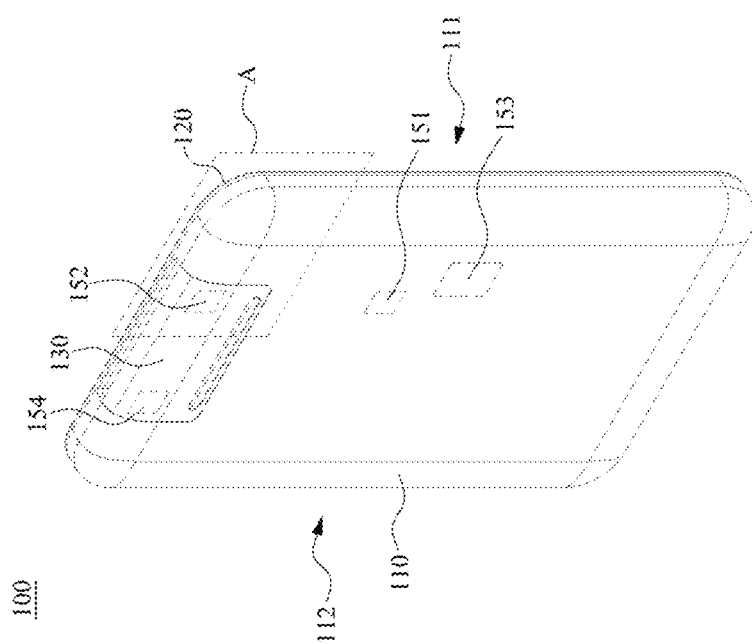
FIG. 2 and FIG. 3 are perspective views showing the electronic device in FIG. 1 viewed from another perspective in two different operating states.
Figure 3:
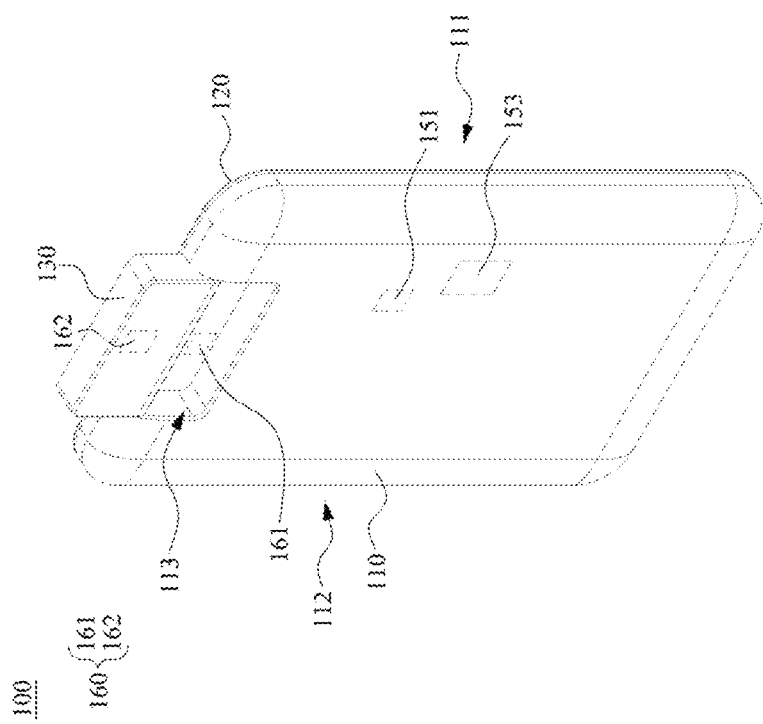
Figure 4:
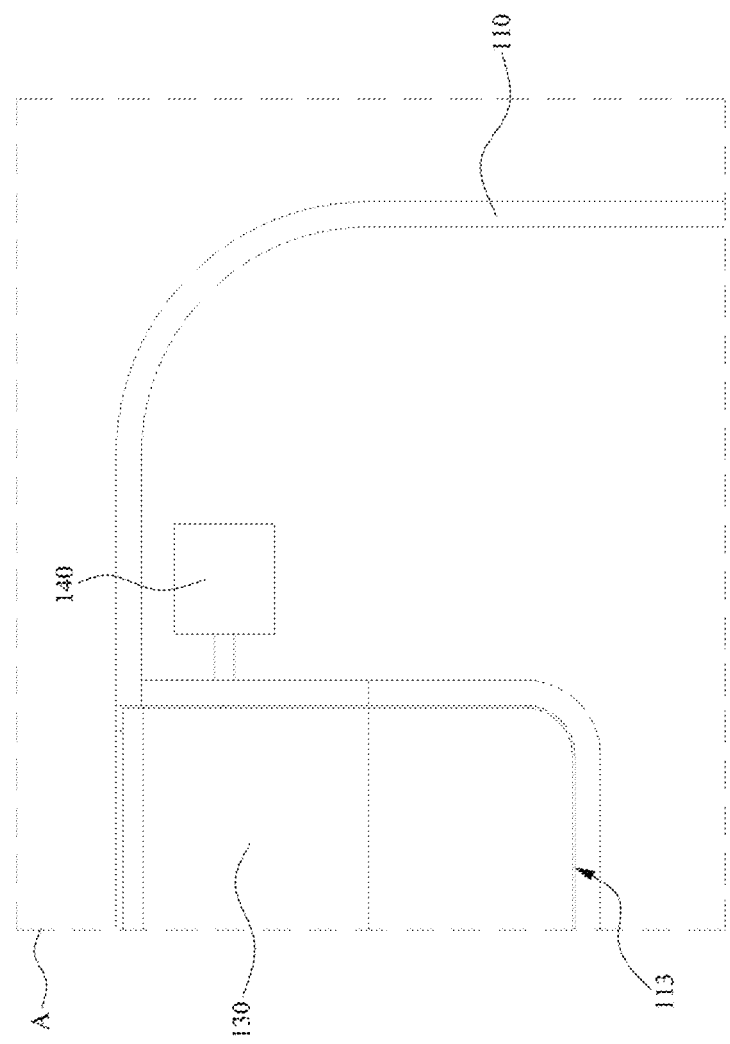
FIG. 4 is a partially enlarged side perspective view showing the electronic device in FIG. 1 in area A.
Figure 5:
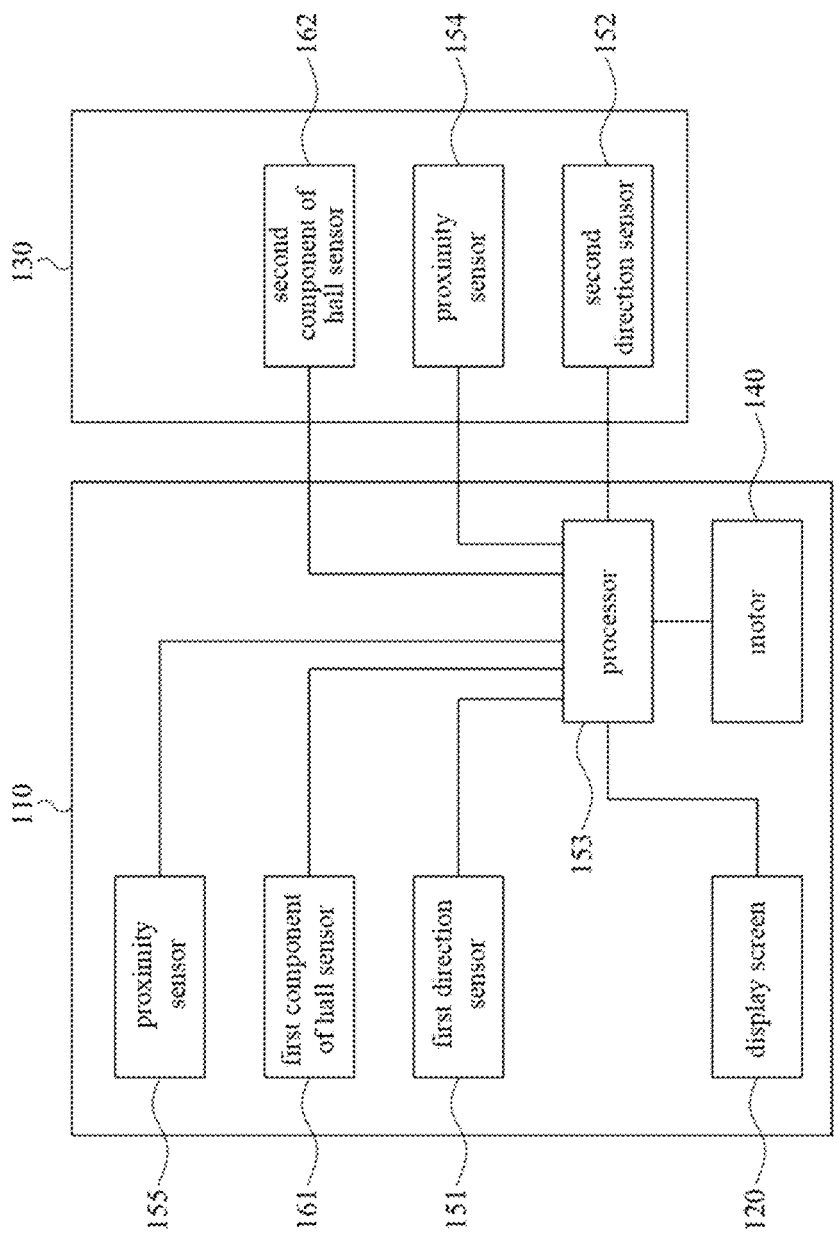
FIG. 5 is a functional block diagram showing the electronic device in FIG. 1.

As shown in FIG. 2 and FIG. 3, the electronic device 100 also includes a first direction sensor 151 and a second direction sensor 152. In an embodiment, the first direction sensor 151 is disposed on the body 110 and provides a first sensing signal. In an embodiment, the second direction sensor 152 is disposed on the camera module 130 and provides a second sensing signal. In an embodiment, the processor 153 is electrically connected to the first direction sensor 151 and the second direction sensor 152, and controls the motor 140 based on the first sensing signal and the second sensing signal. In some embodiments, the first direction sensor 151 and the second direction sensor 152 are accelerometers, gyroscopes, or gravity sensors.

In one embodiment, the electronic device 100 has a rotation obstacle detection mechanism for the camera module 130. Specifically, the first direction sensor 151 and the second direction sensor 152 are gyroscopes, the first sensing signal is an angular velocity signal of the body 110, and the second sensing signal is an angular velocity signal of the camera module 130. After the motor 140 is rotated at a rotating speed for a period of time, the processor 153 calculates the angle between the camera module 130 and the body 110 based on the first sensing signal (such as the angular velocity signal of the body 110) and the second sensing signal (such as the angular velocity signal of the camera module 130). When the angle between the camera module 130 and the body 110 is smaller than a predetermined angle corresponding to the rotating speed and the period of time, the processor 153 determines that the rotation of the camera module 130 is obstructed.

In one embodiment, it supposed that the camera module 130 rotating at a rotating speed V from a starting position (such as the rear camera position) to a target position (such as the front camera position) takes no more than S seconds, and when the camera module 130 is in the target position, the angle between the camera module 130 and the body 110 is a preset angle D degree (such as 180 degrees). When the camera module 130 rotates from the starting position at the rotating speed V, and after S seconds have elapsed, the actual angle between the camera module 130 and the body 110 (such as 100 degrees) is less than the preset angle D degrees, then the processor 153 determines that the rotation of the camera module 130 is obstructed from reaching the target position. In some embodiments, the electronic device 100 has different target positions and different settings in different usage situations or operation modes (for example, front and rear camera switching, automatic panoramic shooting, and free angle shooting), and the motor 140 drives the camera module 130 to rotate at different rotating speed.

In one embodiment, when the processor 153 determines that the rotation of the camera module 130 is obstructed, the processor 153 controls the motor 140 to stop driving the camera module 130 to rotate. In an embodiment, when the processor 153 determines that the rotation of the camera module 130 is obstructed, the processor 153 provides a notification message to inform the user, such as, presenting the notification message on the display screen 120. In one embodiment, the notification message provides user operation options (for example, after removing the obstacle, the user may click on a button on the display screen 120 to instruct the camera module 130 to continue to rotate toward the target position).

As shown in FIG. 2, in an embodiment, the electronic device 100 further includes a proximity sensor 154. The proximity sensor 154 is disposed on the camera module 130, and is electrically connected to the processor 153. The processor 153 is configured to determine whether an obstacle appears on a moving path of the camera module 130 based on a first sensing result of the proximity sensor 154.

In one embodiment, the proximity sensor 154 includes a light sensor. In an embodiment, the camera module 130 includes a laser focusing element, which is used as the proximity sensor 154 to assist to determine whether an obstacle appears on the moving path of the camera module 130 or not.

In some embodiments, the electronic device 100 has a fall protection mechanism of the camera module 130. Specifically, the first direction sensor 151 and the second direction sensor 152 are acceleration sensors, and the first direction sensor 151 or the second direction sensor 152 provides an acceleration value. When the camera module 130 is not in the rear camera position (that is, not housed in the accommodation space 113) and the acceleration value is greater than a preset acceleration, the processor 153 determines that the electronic device 100 is in a falling state and controls the motor 140 to drive the camera module 130 to rotate to the rear camera position to protect the camera module 130. In one embodiment, when the processor 153 determines that the electronic device 100 is in a falling state (that is, when the acceleration value is greater than the preset acceleration), the processor 153 controls the motor 140 to rotate faster than the rotating speed in any other use situation or operating mode. In other words, the rotating speed of the motor 140 when the electronic device 100 is in a falling state is greater than the rotating speed of the motor 140 when the electronic device 100 is in switching between a front camera mode and a rear camera mode or in an automatic panoramic shooting mode. The feature accelerates the camera module 130 to rotate back to the first position (such as the rear camera position).

In one embodiment, the processor 153 is configured to execute the face unlock function. When the camera module 130 is located at the rear camera position and the face unlock function is activated, the processor 153 determines whether the electronic device 100 is placed substantially horizontally (such as when the electronic device 100 is put on a desk surface) based on the first sensing signal and the second sensing signal. In this embodiment, the first direction sensor 151 and the second direction sensor 152 are gravity sensors, the first sensing signal is the gravity value of the body 110 and the second sensing signal is the gravity value of the camera module 130. When the processor 153 determines that the electronic device 100 is placed substantially horizontally on the desk surface based on the first sensing signal and the second sensing signal, the processor 153 controls the motor 140 not to drive the camera module 130 to rotate. Thus to prevent the motor 140 or the camera module 130 from being damaged when it starts to rotate but blocked by the desk surface while the user activates the face unlock function with the display screen 120 facing upward.

In some embodiments, the electronic device 100 further includes a speaker 156, and the speaker 156 is located at the same side of the display screen 120. When the camera module 130 is located at the front camera position and the electronic device 100 receives an incoming call, the processor 153 is configured to determine whether the electronic device 100 activates hands free function and no earphones (including Bluetooth wireless earphones and wired earphones) are connected or not. When it is determined that the electronic device 100 does not activate the hands free function and no earphones are connected, the processor 153 controls the motor 140 to drive the camera module 130 to rotate toward the rear camera position, which avoids the camera module 130 at the front camera position obstructing the user to use the speaker 156 to talk.

In an embodiment, the electronic device 100 further includes a proximity sensor 155, and the processor 153 is electrically connected to the proximity sensor 155. The proximity sensor 155 is disposed on the first side 111 of the body 110 and is configured to provide a second sensing result to the processor 153. When the electronic device 100 receives an incoming call, if the processor 153 determines that an object approaches the first side 111 of the body 110 according to the second sensing result, the processor 153 controls the motor 140 not to drive the camera module 130 to rotate. In this way, the user is not affected by the rotation of the camera module 130 (for example, the hair is pinched when the camera module 130 rotates toward the rear camera position) when using the speaker 156 to make a call.

In an embodiment, when the electronic device 100 is in an operation modes of automatic panoramic shooting, free-angle shooting, or motion tracking, even if the processor 153 determines that an object approaches the first side 111 of the body 110 according to the second sensing result, the processor 153 still controls to keep the motor 140 driving the camera module 130 to rotate, to avoid the interruption of the operation by the user.

In some implementations, the electronic device 100 further includes a hall sensor 160 configured to provide a third sensing result. The hall sensor 160 includes a first component 161 and a second component 162. The first component 161 is disposed in the accommodation space 113 of the body 110, and the second component 162 is disposed in the camera module 130 and faces the accommodation space 113. During the process that the camera module 130 rotates toward the rear camera position, when the processor 153 determines that the camera module 130 is close to the rear camera position according to the third sensing result, the processor 153 lowers the rotating speed of the motor 140. In an embodiment, the third sensing result includes a first signal showing that the angle between the camera module 130 and the body 110 exceeds an approach angle threshold, where the approach angle threshold is 20 degrees. In an embodiment, the third sensing result includes a second signal showing that the angle between the camera module 130 and the body 110 is less than or equal to the approach angle threshold, where the approach angle threshold is 20 degrees.

In detail, when the third sensing result shows that the angle between the camera module 130 and the body 110 is within K degrees (such as 20 degrees), it indicates that the camera module 130 approaches the rear camera position, and the processor 153 decreases the rotating speed of the motor 140. Conversely, when the third sensing result shows that the angle between the camera module 130 and the rear camera position exceeds K degrees, it indicates that the camera module 130 is not close to the rear camera position. In this situation, the processor 153 outputs a signal that drives the motor 140 to rotate for a relatively long period of time to reduce the rotating speed of the motor 140 (in an embodiment, by adjusting and reducing the duty cycle by pulse width modulation (PWM)).

In one embodiment, the rotation time of the camera module 130 from the front camera position to the rear camera position is preset with N seconds (and/or the motor 140 is preset to rotate M turns). After a certain proportion of the rotation time (for example: after 90% of the rotation time passed), the processor 153 lowers the rotating speed of the motor 140.

Depending on the hardware and mechanism variability of the electronic device 100 and the placing direction of the electronic device 100 (such as horizontal or vertical placement), the time taken by the camera module 130 to rotate from the rear camera position to the front camera position or to rotate from the front camera position to the rear camera position is different, or the number of turns for the motor 140 is different. Thus, in some embodiments, the electronic device 100 is configured to perform a calibration process to obtain information about the time taken by the camera module 130 that rotated from the rear camera position to the front camera position (or from the front camera position to the rear camera position) or the number of rotations of the motor 140 to ensure that the camera module 130 actually rotates to the rear camera position or the front camera position.

During the calibration process, the processor 153 is configured to: (1) control the motor 140 to drive the camera module 130 to rotate from the first position toward the second position (for example: from the rear camera position to the front camera position) or from the second position to the first position (for example: from the front camera position rotates to the rear camera position), and trigger a timer (such as a timer program or a hardware timer) to calculate the time of the entire flipping process of the camera module 130, or a revolution calculator (such as a revolution count program or a revolution count hardware component) to calculate the total number of revolutions of the motor 140 during the entire flipping process of the camera module 130; (2) periodically calculate the rotating speed of the camera module 130 according to the first sensing signal and the second sensing signal during the rotation of the camera module 130; (3) determine that the camera module 130 reaches the second position, and stop the timer or the revolution calculator when the number of times that the rotating speed of the camera module 130 is lower than a rotating speed threshold for a preset number; and (4) record the measurement results of the timer or the revolution calculator (for example: the time of the entire flipping process of the camera module 130 or the total number of revolutions of the motor 140 during the entire flipping process of the camera module 130). In some embodiments, the time measured by the timer or the number of turns measured by the revolution calculator is recorded in a storage unit (not shown) of the electronic device 100.

The time measured by the timer or the number of revolutions measured by the revolution calculator is used as a preset schedule (including the number of revolutions of the motor 140 and the time required to rotate from the first position to the second position, or the number of revolutions of the motor 140 and the time required to rotate from the second position to the first position). The preset schedule is the basis for the processor 153 to control the motor 140. In an embodiment, when the processor 153 executes a camera application and the camera application switches from the rear camera mode to the front camera mode according to a user operation, at this time, the processor 153 controls the motor 140 to drive the camera module 130 to rotate from the rear camera position to the front camera position according to the preset schedule.

In one embodiment, the electronic device 100 guides the user to keep the electronic device 100 in a horizontal state and performs more than one calibration process (such as three times), and then guides the user to keep the electronic device 100 in a vertical position and performs more than one calibration process (such as three times). Based on the value measured by the timer/the revolution calculator in the calibration process, the maximum value (the longest time/the most revolutions) is selected as the preset schedule that the camera module 130 rotates from the first position to the second position. In some embodiments, the system presets a predetermined upper limit time/predetermined upper limit revolutions. If the selected maximum value exceeds the predetermined upper limit time/predetermined upper limit revolutions, the predetermined upper limit time/predetermined upper limit revolutions is used as the preset schedule.

Figure 6:
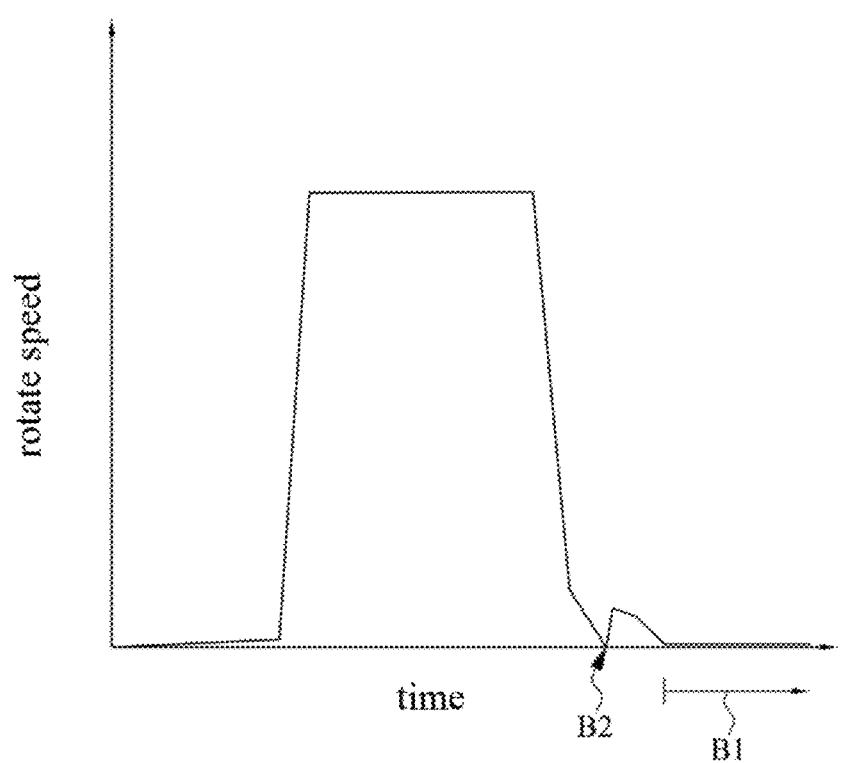
FIG. 6 is a diagram showing the relationship between the rotating speed and time of the camera module of the electronic device shown in FIG. 1.

Please refer to FIG. 6. When the camera module 130 rotates close to the front camera position or the rear camera position, the rotating speed of the motor 140 is decreased such that the rotating speed of the camera module 130 is slowed down to stop rotating the camera module 130 (such as shown in interval B1 in FIG. 6). In an embodiment, before the camera module 130 reaches the front camera position/the rear camera position, the first sensing signal and the second sensing signal show that the angular velocity of the camera module 130 is zero (such as the stop point B2 in FIG. 6). In step (3) of the calibration process, the processor 153 determines that the camera module 130 has reached the second position when the number of times that the rotating speed of the camera module 130 is lower than the rotating speed threshold meets a preset number, which avoids misjudgment caused by the foregoing situation.

Furthermore, in some embodiments, the processor 153 determines that the camera module 130 reaches the second position when the rotating speed of the camera module 130 is lower than the rotating speed threshold for a preset number of times consecutively, and then stop the timer or the revolution calculator, and record the measurement results of the timer or the revolution calculator. In these embodiments, when an interruption occurs (that is, the rotating speed of the camera module 130 is higher than the rotating speed threshold, the processor 153 must recount the number of times that the rotating speed of the camera module 130 is lower than the rotating speed threshold for a preset number consecutively), in order to determine that the camera module 130 reaches the second position. In other embodiment, the interruption is allowed to occur P times (such as three times). When the number of times exceeds P times, the processor 153 drives the timer/the revolution calculator to retime/recount.

In some embodiments, the electronic device 100 has a mechanism to prevent the camera module 130 from being loosened, and in a specific use situation, the camera module 130 is housed in the rear camera position. In some embodiments, when the third sensing result (provided by the hall sensor 160) shows that the camera module 130 is close to the rear camera position, and the electronic device 100 detects that the camera module 130 is pressed (for example: the processor 153 determines that the camera module 130 has changed its position based on the first sensing signal and the second sensing signal), the processor 153 controls the motor 140 to rotate the camera module 130 toward the rear camera position by an angle (such as 5 degrees).

In some embodiments, when the electronic device 100 sleeps or wakes up, the processor 153 controls the motor 140 to drive the camera module 130 to rotate toward the rear camera position by an angle (such as 2 degrees). In some embodiments, no matter the electronic device 100 is powered on or off, when the camera module 130 is not in the rear camera position, the processor 153 controls the motor 140 to drive the camera module 130 to rotate to the rear camera position. In some embodiments, when the camera module 130 is blocked from rotating away from the rear camera position (for example: when the electronic device 100 controls the camera module 130 to rotates away from the rear camera position after 200 milliseconds but the angle between the camera module 130 calculate by the processor 153 does not exceed 10 degrees, it is determined that the camera module 130 is obstructed from rotating after leaving the rear camera position), the processor 153 controls the motor 140 to drive the camera module 130 to rotate toward the rear camera position by an angle (such as 10 degrees).

In some embodiments, when the electronic device 100 performs the face unlock function but the camera module 130 is obstructed from rotating from the rear camera position toward the front camera position, the processor 153 controls the motor 140 to drive the camera module 130 rotates back to the rear camera position. In some embodiments, the user interface provided by the electronic device 100 includes a reset button (for example, a button presented on the display screen 120), and the processor 153 controls the motor 140 to drive the camera module 130 to rotate to the rear camera position in response to the reset button being pressed.

In summary, the electronic device disclosed herein includes a rotatable camera module, and a direction sensor is provided on each of the camera module and the electronic device body. The processor of the electronic device controls the motor that drives the camera module based on the measurement results of the direction sensor, which provides various functions.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device comprising:
  a body;
  a camera module, rotatably disposed on the body;
  a motor, connected to the camera module, and configured to drive the camera module to rotate between a front camera position and a rear camera position relative to the body;
  a first direction sensor, disposed on the body and configured to provide a first sensing signal;
  a second direction sensor, disposed on the camera module and configured to provide a second sensing signal; and
  a processor, electrically connected to the motor, the first direction sensor, and the second direction sensor, and the processor is configured to control the motor based on the first sensing signal and the second sensing signal;
  wherein when the motor is rotated at a rotating speed for a period of time, the processor is configured to calculate an angle between the camera module and the body based on the first sensing signal and the second sensing signal, if the angle is smaller than a predetermined angle corresponding to the rotating speed and the period of time, the processor determines that the rotation of the camera module is obstructed.

2. The electronic device according to claim 1, wherein the processor is configured to perform a face unlock function, when the camera module is located at the rear camera position and the face unlock function is activated, if the processor determines that the electronic device is placed horizontally based on the first sensing signal and the second sensing signal, the processor controls the motor not to drive the camera module to rotate.

3. The electronic device according to claim 1, wherein when the camera module is located at the front camera position and the electronic device receives an incoming call, if the hands free function of the electronic device is not activated and no earphones are connected, the processor controls the motor to drive the camera module to rotate to the rear camera position.

4. The electronic device according to claim 3, further comprising:
   a display screen, wherein the body has a first side and a second side opposite with each other, the display screen is disposed on the first side, and the camera module is disposed on the second side; and
   a proximity sensor, disposed on the first side of the body and configured to provide a second sensing result;
   wherein, when the processor determines that an object approaches the first side of the body according to the second sensing result, the processor controls the motor not to drive the camera module to rotate.

5. The electronic device according to claim 1, wherein the first direction sensor and the second direction sensor include accelerometers, gyroscopes, or gravity sensors.

6. The electronic device according to claim 5, wherein the first direction sensor or the second direction sensor is configured to provide an acceleration value, when the camera module is not positioned at the rear camera position and the acceleration value is greater than a preset acceleration, the processor controls the motor drives the camera module to rotate toward the rear camera position.

7. The electronic device according to claim 1, wherein the processor further configured to:
   control the motor to drive the camera module to rotate from a first position to a second position, and simultaneously start a timer or a revolution calculator, wherein the revolution calculator is configured to calculate the number of revolutions of the motor;
   periodically calculate the rotating speed of the camera module according to the first sensing signal and the second sensing signal during the rotation of the camera module;
   determine that the camera module has reached the second position, and stop the timer or the revolution calculator when the number of times that the rotating speed of the camera module is lower than a rotating speed threshold reaches a preset number; and
   record measurement results of the timer or the revolution calculator;
   wherein the first position is the front camera position and the second position is the rear camera position, or the first position is the rear camera position and the second position is the front camera position, respectively.

8. The electronic device according to claim 1, further comprising:
   a hall sensor, configured to provide a third sensing result and including a first component and a second component, wherein the first component and the second component are disposed on the body and the camera module respectively;
   wherein during the camera module rotates toward the rear camera position, the processor reduces the rotating speed of the motor when the processor determines that the camera module is close to the rear camera position according to the third sensing result.

9. The electronic device according to claim 8, wherein the body has an accommodation space, the camera module in the rear camera position is located in the accommodation space, the first component is disposed in the accommodation space, and the second component is disposed on the camera module and faces the accommodation space.

* * * * *